No. 627,917. Patented June 27, 1899.
M. E. FULD.
DRY CELL.
(Application filed Jan. 21, 1899.)
(No Model.)

Witnesses
Percy C. Bowen
C. A. Bateman

Inventor
Manes E. Fuld,
by Wilkinson & Fisher,
Attorneys.

THE NORRIS PETERS CO., PHOTO-LITHO., WASHINGTON, D. C.

UNITED STATES PATENT OFFICE.

MANES E. FULD, OF BALTIMORE, MARYLAND.

DRY CELL.

SPECIFICATION forming part of Letters Patent No. 627,917, dated June 27, 1899.

Application filed January 21, 1899. Serial No. 702,960. (No model.)

*To all whom it may concern:*

Be it known that I, MANES E. FULD, a citizen of the United States, residing at Baltimore, in the State of Maryland, have invented certain new and useful Improvements in Dry Cells; and I do hereby declare the following to be a full, clear, and exact description of the invention, such as will enable others skilled in the art to which it appertains to make and use the same.

My invention relates to improvements in dry cells; and it consists of certain novel features hereinafter described and claimed.

My invention will be understood by reference to the accompanying drawings, in which the same parts are indicated by the same letters throughout the several views.

Figure 2:
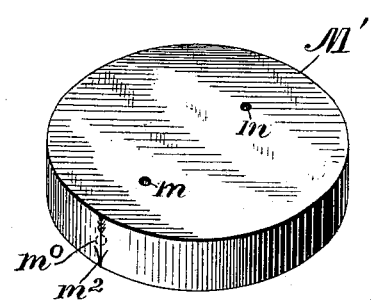
Figure 3:
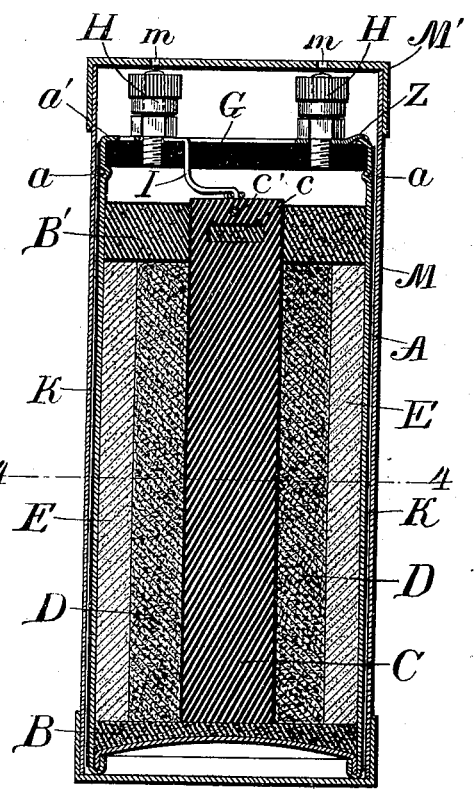
Figure 1:
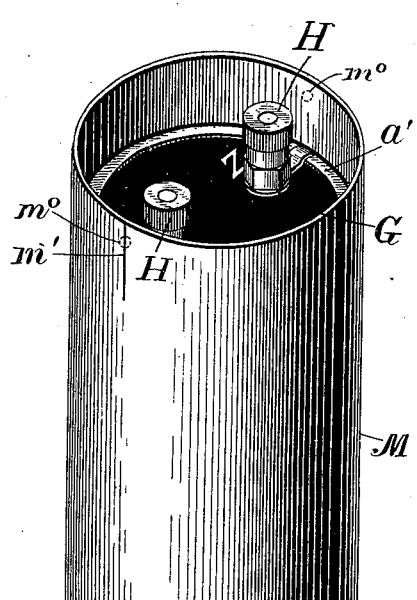
Figure 4:
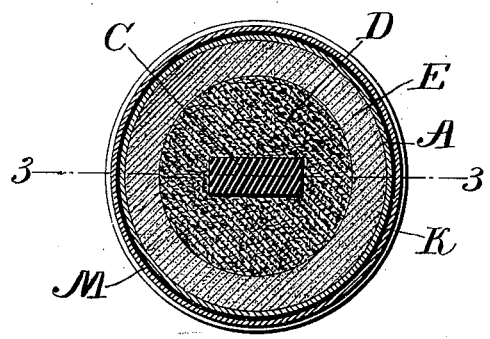

Figure 1 represents one of my improved cells inclosed in my improved packing-box. Fig. 2 represents the lid of the box removed from the same. Fig. 3 represents a section along the line 3 3 of Fig. 4 and shows the cell in the packing-box and the cover of the latter on, and Fig. 4 represents a section along the line 4 4 of Fig. 3 and looking down.

A represents a cylindrical zinc shell provided with a suitable bottom and is knurled near the top, as at $a$, to form a seat for the fiber cap G. The top edge of the shell is then bent over the edge of the cap G, as at $a'$. After this the cell is completed.

B represents a layer of pitch and resin, which are fused and poured into the bottom of the cell and allowed to cool. On this pitch and resin at the bottom of the shell rests the end of the carbon electrode C, which electrode is preferably made rectangular in form and is provided with a transverse slot $c$ near the upper end thereof and a hole $c'$ for the terminal wire I, leading to one of the binding-posts H, secured in the fiber cap G. The other binding-post H is connected by the strip Z to the shell A. (See Figs. 1 and 3.)

Surrounding the carbon electrode C is a cylindrical granular mass of powdered graphite mixed with manganese peroxid and other well-known depolarizing agents compressed so as to adhere together or held together by any suitable binding agent. Outside this cylindrical granular mass D is an annular layer of plaster-of-paris impregnated with sal-ammoniac and other well-known active agents. A porous partition between the excitant and depolarizer may be inserted, if preferred, thus acting as a substitute for the plaster-of-paris, or the same may be used in connection with the plaster-of-paris, as above described. Above this plaster-of-paris E and granular mass D is a seal B', made of pitch, resin, and asphaltum, which is poured into the cell while in a fused condition and runs into and through the slot $c$, adhering closely to the carbon electrode C. Before being used in the cell this carbon rod is first coated with a mixture of gutta-percha and paraffin to a line just below the oblong slot near the top of the carbon. This mixture is thin and thoroughly permeates the pores of the carbon, and then when the thicker hard sealing is poured in and about the upper end it is more quickly and firmly attached to the carbon and not only prevents the creeping of the salts upward above the lower line of the slot, but assists further, by reason of its firm hold on the carbon, in preventing the latter from being released out of its position.

Above this cell is a small space separating the same from the fiber cap G and connecting the binding-post H, as above stated. The shell A is preferably surrounded with a wrapping of paper K or other cheap insulating material.

When packed up, the cell is preferably put in the pasteboard box M, having a detachable top M' pierced with two small holes $m$ so arranged that when the arrow $m^2$ on the top points to the line $m'$ on the box these two holes $m$ will be immediately over the binding-posts H. When selling the cells, if the terminal wires of the galvanometer or of an electric bell be introduced through these holes $m$ and made to touch the binding-posts H the purchaser can note for himself whether the cell is active or not, and with a suitable instrument he can determine the power of the cell.

Instead of having the holes in the top of the box, as shown in Figs. 2 and 3, these holes may be made in the sides, as indicated in dotted lines at $m^0$ in Figs. 1 and 2. In either event it is necessary that the holes should be so disposed that the ends of the terminals from the testing instrument should be brought into contact with the binding-posts. By this arrangement the power of the cell and its activity can be determined without breaking the package, and thus each individual cell can be guaranteed at the time of sale.

This cell-case is described and claimed in my application, Serial No. 710,493, filed March 25, 1899.

Having thus described my invention, what I claim, and desire to secure by Letters Patent of the United States, is—

1. In a dry cell, the combination with a zinc shell forming the cell-case and also one of the electrodes, of a bottom seal composed of pitch and resin, a carbon electrode resting on this bottom seal and provided with a transverse slot near its upper end, a granular mass composed of powdered graphite and one or more depolarizing agents surrounding said carbon electrode, plaster-of-paris impregnated with one or more active agents surrounding said granular mass and interposed between said mass and said zinc shell, and a top seal hermetically sealing the upper end of said cell and projecting into and through said transverse slot in the carbon electrode, substantially as described.

2. In a dry cell, the combination with a zinc shell, a bottom seal placed in the bottom of said cell, a carbon electrode resting on said bottom seal and provided with a transverse slot near its upper end, and a hole for the terminal wire, a granular mass composed of powdered graphite and one or more depolarizing agents made cylindrical on the exterior and surrounding said carbon electrode, an annular mass of plaster-of-paris impregnated with active agents and set between said granular mass and said zinc shell, and a seal composed of pitch, resin, and asphaltum placed above said plaster-of-paris and said granular mass and projecting into and through said slot in the carbon electrode, substantially as described.

3. In a dry cell, the combination with a zinc shell forming a cell-case and also one of the electrodes, of a bottom seal composed of pitch and resin, a carbon electrode resting on this bottom seal and provided with a transverse slot near its upper end, binding-posts connected respectively to the carbon electrode and to the zinc shell, a granular mass composed of powdered graphite and one or more depolarizing agents surrounding said carbon electrode, plaster-of-paris impregnated with one or more active agents surrounding said granular mass and interposed between said mass and said zinc shell, a top seal hermetically sealing the upper end of said cell and projecting into and through said transverse slot in the carbon electrode, a fiber cap placed above the end of said carbon electrode, and connecting-strips between one of said binding-posts and said shell and between the other of said binding-posts and carbon electrode, substantially as described.

4. In a dry cell, the combination with a zinc shell forming the cell-case and also one of the electrodes, of a bottom seal composed of pitch and resin, a carbon electrode resting on this bottom seal and provided with a transverse slot near its upper end, a granular mass composed of powdered graphite and one or more depolarizing agents surrounding said carbon electrode, plaster-of-paris impregnated with one or more active agents surrounding said granular mass and interposed between said mass and said zinc shell, a top seal hermetically sealing the upper end of said cell and projecting into and through said transverse slot in the carbon electrode, a cap of non-conducting material, binding-posts in said cap, and a box inclosing the cell with perforations in the top over said binding-posts, substantially as and for the purposes described.

5. In a dry cell, the combination with a zinc shell, a bottom seal placed in the bottom of said cell, a carbon electrode resting on said bottom seal and provided with a transverse slot near its upper end, and a hole for the terminal wire, a granular mass composed of powdered graphite and one or more depolarizing agents made cylindrical on the exterior and surrounding said carbon electrode, an annular mass of plaster-of-paris impregnated with active agents and set between said granular mass and said zinc shell, and a seal composed of pitch, resin and asphaltum placed above said plaster-of-paris and said granular mass and projecting into and through said slot in the carbon electrode, a cap of non-conducting material, binding-posts in said cap, and a box inclosing the cell with perforations in the top over said binding-posts, substantially as and for the purposes described.

In testimony whereof I affix my signature in presence of two witnesses.

MANES E. FULD.

Witnesses:
GEO. W. HAULENBEEK,
JULIUS W. STUART.